United States Patent
Yu

(10) Patent No.: US 9,312,979 B2
(45) Date of Patent: Apr. 12, 2016

(54) CHANNEL ESTIMATION IN OPTICAL COMMUNICATION BASED ON ORTHOGONAL FREQUENCY DIVISION MULTIPLEXING

(75) Inventor: Jianjun Yu, Basking Ridge, NJ (US)

(73) Assignee: ZTE (USA) Inc., Austin, TX (US)

( * ) Notice: Subject to any disclaimer, the term of this patent is extended or adjusted under 35 U.S.C. 154(b) by 0 days.

(21) Appl. No.: 14/238,464

(22) PCT Filed: Aug. 10, 2012

(86) PCT No.: PCT/US2012/050460
§ 371 (c)(1),
(2), (4) Date: Feb. 11, 2014

(87) PCT Pub. No.: WO2013/025559
PCT Pub. Date: Feb. 21, 2013

(65) Prior Publication Data
US 2014/0199073 A1    Jul. 17, 2014

Related U.S. Application Data

(60) Provisional application No. 61/523,234, filed on Aug. 12, 2011.

(51) Int. Cl.
*H04B 10/556* (2013.01)
*H04J 14/02* (2006.01)
(Continued)

(52) U.S. Cl.
CPC .......... *H04J 14/0221* (2013.01); *H04B 10/556* (2013.01); *H04L 5/0048* (2013.01); *H04L 27/2601* (2013.01); *H04L 27/2613* (2013.01)

(58) Field of Classification Search
CPC  H04B 10/556; H04J 14/0221; H04L 27/2601

USPC ...................... 398/76, 198, 197, 81
See application file for complete search history.

(56) References Cited

U.S. PATENT DOCUMENTS

2007/0121742 A1* 5/2007 Tamaki ............. H03M 13/2957
375/260
2009/0169213 A1  7/2009 Lowery et al.
(Continued)

FOREIGN PATENT DOCUMENTS

CN          1964340 A     5/2007
CN       101577691 A    11/2009

OTHER PUBLICATIONS

X.Q. Jin, R.P. Giddings, and J.M. Tang, Real-time transmission of 3Gbs 16-QAM encoded optical OFDM signals over 75km SMFs with negative power penalties,Optics Express, vol. 17, Issue 17, pp. 14574-14585 (2009).*

(Continued)

*Primary Examiner* — David Payne
*Assistant Examiner* — Omar S Ismail
(74) *Attorney, Agent, or Firm* — Perkins Coie LLP

(57) ABSTRACT

Techniques for optical communications using optical orthogonal frequency division multiplexing (OFDM) include operating a signal transmitter to modulate laser light to produce modulated light that carries, in optical domain, OFDM subcarriers for carrying communication information, without a frequency guard band between the OFDM subcarriers, and pilot subcarriers for channel estimation at a signal receiver, each pilot subcarrier being free of communication information, and controlling optical power of the pilot subcarriers to vary with optical frequencies of the pilot subcarriers so that optical power of a pilot subcarrier at a high optical frequency is different from optical power of another pilot subcarrier at a low optical frequency.

20 Claims, 6 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2009/0214210 A1 | 8/2009 | Yu et al. | |
| 2010/0008680 A1* | 1/2010 | Chen | H04B 10/548 398/198 |
| 2010/0329683 A1* | 12/2010 | Liu | H04B 10/2513 398/81 |
| 2011/0013914 A1 | 1/2011 | Lowery | |

OTHER PUBLICATIONS

R.P. Giddings, X.Q. Jin and J.M. tang, First experimental demonstration of 6Gb/s realtime optical OFDM transceivers incorporating channel estimation and variable power loading, Oct. 26, 2009, vol. 17, No. 22 /Optics Express 19727.*

Cao, Z., et al., "Direct-Detection Optical OFDM Transmission System without Frequency Guard Band," IEEE Photonics Technology Letters, 22(11):736-738, Jun. 2010.

Ali, A., et al., "Spectral Efficiency and Receiver Sensitivity in Direct Detection Optical-OFDM," Conference on Optical Fiber Communication, San Diego, California, USA, 3 pages, Mar. 22-26, 2009.

Cao, Z., et al., "Reduction of Intersubcarrier Interference and Frequency-Selective Fading in OFDM-ROF Systems," Journal of Lightwave Technology, 28(16):2423-2429, Aug. 2010.

Jansen, S.L., et al., "Coherent Optical 25.8-Gb/s OFDM Transmission Over 4160-km SSMF," Journal of Lightwave Technology, 26(1):6-15, Jan. 2008.

Schmidt, B.J.C., et al., "Experimental Demonstrations of Electronic Dispersion Compensation for Long-Haul Transmission Using Direct-Detection Optical OFDM," Journal of Lightwave Technology, 26(1):196-203, Jan. 2008.

Schmidt, B.J.C., et al., "Impact of PMD in Single-Receiver and Polarization-Diverse Direct-Detection Optical OFDM," Journal of Lightwave Technology, 27(14):2792-2799, Jul. 2009.

Schuster, M., et al., "Spectrally Efficient Compatible Single-Sideband Modulation for OFDM Transmission With Direct Detection," IEEE Photonics Technology Letters, 20(9):670-672, May 2008.

Shieh, W., "PMD-Supported Coherent Optical OFDM Systems," IEEE Photonics Technology Letters, 19(3):134-136, Feb. 2007.

Shieh, W., et al., "Coherent optical OFDM: theory and design," Optics Express, 16(2):841-859, Jan. 2008.

Takahashi, H., "Coherent OFDM Transmission with High Spectral Efficiency," 35th European Conference on Optical Communication (ECOC'09), Vienna, Austria, paper 1.3.3, pp. 1-4, Sep. 2009.

Xie, C., "PMD Insensitive Direct-Detection Optical OFDM Systems Using Self-Polarization Diversity," Conference on Optical Fiber Communication/National Fiber Optic Engineers Conference (OFC/NFOEC), San Diego, CA, paper OMM2, pp. 1-3, Feb. 2008.

Office Action mailed Aug. 6, 2015 for Chinese Patent Application No. 201280039276.X, filed on Aug. 10, 2012 (9 pages).

* cited by examiner

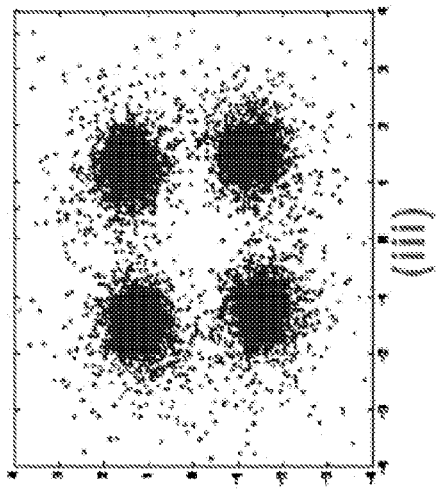
FIG. 5C
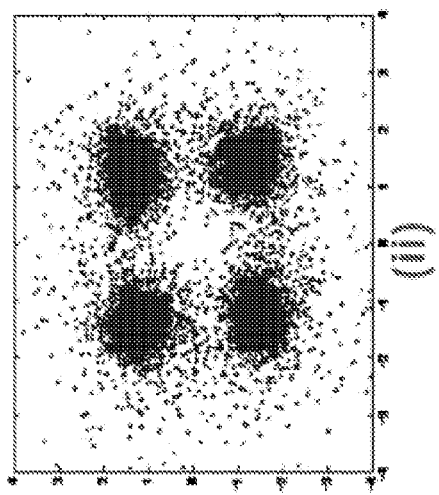
FIG. 5B
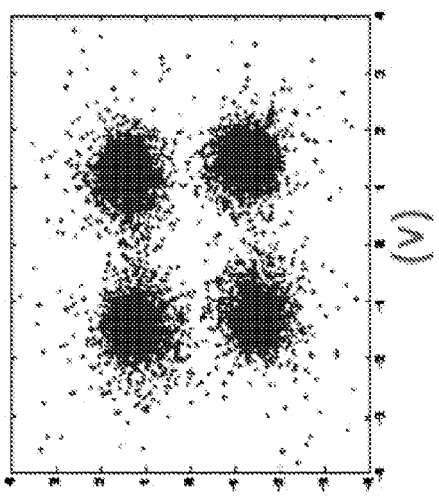
FIG. 5E
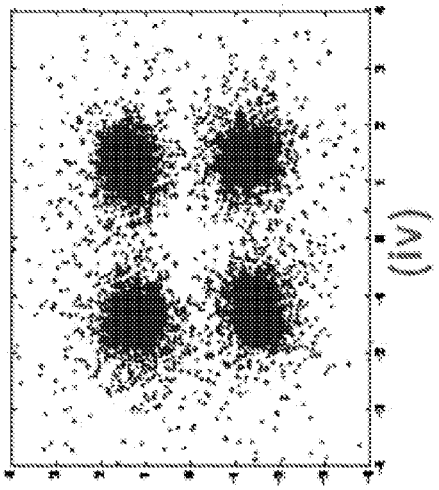
FIG. 5D
FIG. 5A

CHANNEL ESTIMATION IN OPTICAL COMMUNICATION BASED ON ORTHOGONAL FREQUENCY DIVISION MULTIPLEXING

CROSS REFERENCE TO RELATED APPLICATIONS

This patent application claims the benefit of U.S. Provisional Patent Application No. 61/523,234, filed Aug. 12, 2011. The entire content of the before-mentioned patent application is incorporated by reference as part of the disclosure of this application.

BACKGROUND

This patent document relates to optical communications, and related devices, systems and techniques, including optical communications based on Optical orthogonal frequency division multiplexing.

Optical orthogonal frequency division multiplexing (OOFDM) has actively been investigated due to its potential of electrical equalization to eliminate fiber chromatic dispersion (CD) and polarization mode dispersion (PMD). Besides, highly spectral efficiency makes it attractive for the future high capacity signal transmission. The optical OFDM system can be mainly classified into two types: coherent optical OFDM (CO-OFDM) system and direct-detected optical OFDM (DDO-OFDM) system. In general, CO-OFDM exhibits better performance in receiver sensitivity, spectral efficiency and robustness against polarization mode dispersion. However, the transmitter and receiver is more complex and expensive. In contrast, the DDO-OFDM system is much easy to be implemented, and it has the merit of the low cost.

SUMMARY

This document provides, among others, optical communication systems, devices and methods that perform channel estimation based on pilots in a baseband double sideband (DSB) DDO-OFDM system without frequency guard bands between subcarriers. This method can be implemented in a way that improves the tolerance of SSMI and FF by the system.

We experimentally investigated the effect of pilot power allocation on the performance of channel estimation in baseband direct-detected optical OFDM system. By comparing five exemplary schemes of the pilot power allocation, we found that the scheme of the pilot power allocation with the first decreased then increased pilot power has the most compact and clearest constellation and the best bit error rate (BER) performance. This scheme suffers from the least power attenuation caused by frequency fading (FF) and subcarriers to subcarriers mixing interference (SSMI).

BRIEF DESCRIPTION OF DRAWINGS

FIGS. 5A-5E Constellations after 100 km SMF transmission with schemes (i)-(v)

DETAILED DESCRIPTION

Figure 1:
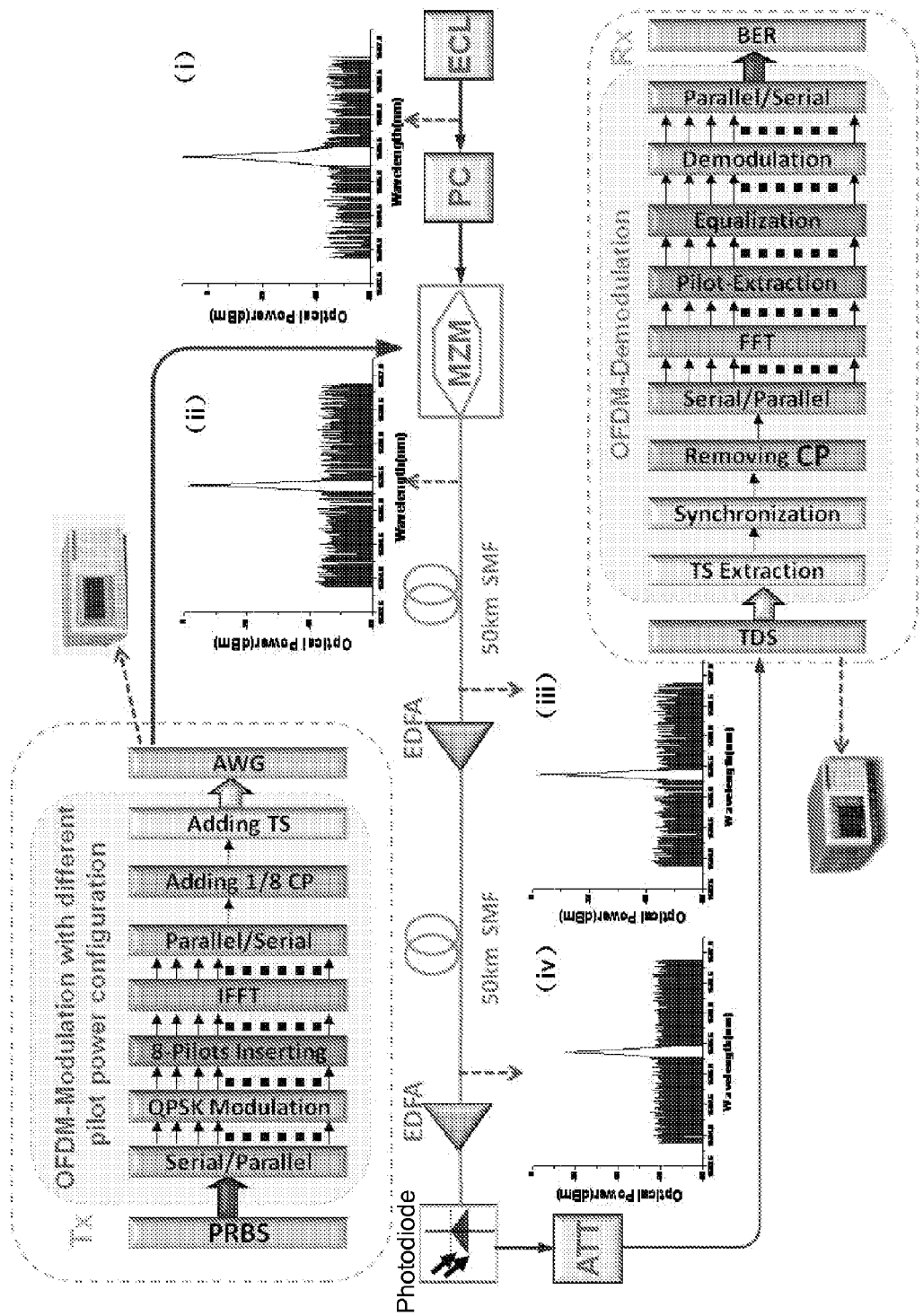
FIG. 1 depicts an experimental setup for IM-DD OOFDM transmission system with QPSK modulation scheme. ECL: External Cavity Laser, PC: Polarization Controller, EDFA: Erbium Doped Fiber Amplifier, ATT: Attenuator. (i): optical carrier spectral; (ii): optical spectral of baseband optical OFDM signal; (iii), (iv): optical spectral of OFDM signal after 50 km and 100 km SMF transmission.

The conventional DDO-OFDM system needs a frequency guard band (FGB) between the optical carrier and the OFDM signal to avoid subcarriers to subcarriers mixing interference (SSMI) near the optical carrier. The presence of the FGB occupies precious spectral space and thus reduces the spectral space for transmitting information. This reduces the spectral efficiency of the system.

One way for improving the system spectral efficiency is to remove the FGB while eliminating the SSMI. In implementations described here, double sideband (DSB) modulation can be used to provide signal modulation without the FGB. DSB does not need IQ external modulator or additional sharp optical band-pass filter (OBF) compared with single sideband (SSB) modulation. One of advantages of using the DSB scheme is to simplify the configuration of transmitter and reduce cost of the system. The DSB DDO-OFDM system may be subject to frequency fading (FF) caused by fiber dispersion. Many techniques have been proposed and experimentally demonstrated to overcome these problems. Cao et al proposed and demonstrated a high-spectral efficiency DDO-OFDM system without FGB with the help of subcarrier modulation, bit inter-leavers and turbo coding technologies.

This document provides a new method of channel estimation based on pilots in a baseband DSB DDO-OFDM system without FGB. This method can be implemented in a way that improves the tolerance of SSMI and FF by the system.

Channel estimation is an important procedure in optical OFDM system. The physical effects of the fiber transmission link on the transmitted signal can be obtained with channel estimation, and subsequent channel equalization can be used to recover the signal.

After passing through various optical and electrical components and fiber transmission, the quality of OFDM signal will be degraded by impairments such as SSMI and FF in the system. Different OFDM subcarriers at different frequencies may experience different distortions. Therefore we set pilots with several different power allocation schemes to investigate the effect of pilot power allocation on the performance of channel estimation.

In one aspect, a method for optical communications based on OFDM is provided to include operating a signal transmitter to modulate laser light to produce modulated light that carries, in optical domain, OFDM subcarriers for carrying communication information, without a frequency guard band between the OFDM subcarriers, and pilot subcarriers for channel estimation at a signal receiver, each pilot subcarrier being free of communication information. This method includes controlling optical power of the pilot subcarriers to vary with optical frequencies of the pilot subcarriers so that optical power of a pilot subcarrier at a high optical frequency is different from optical power of another pilot subcarrier at a low optical frequency.

In another aspect, a signal transmitter for optical communications based on OFDM is provided to include a signal transmitter module that produces OFDM subcarriers for carrying communication information, without a frequency guard band between the OFDM subcarriers, and pilot subcarriers for channel estimation at a signal receiver, each pilot subcarrier being free of communication information; a laser that produces laser light; and an optical modulator that receives and modulates the laser light produce modulated laser light, the optical modulator being coupled to receive and apply the OFDM subcarriers and the pilot subcarriers in modulating the laser light to carry the OFDM subcarriers and the pilot subcarriers in the optical domain. The optical power of the pilot subcarriers is controlled to vary with optical frequencies of the pilot subcarriers so that optical power of a pilot subcarrier at a high optical frequency is different from optical power of another pilot subcarrier at a low optical frequency.

An optical communication system for optical communications based on OFDM is provided to include an optical transmitter that includes (1) a signal transmitter module that produces OFDM subcarriers for carrying communication information, without a frequency guard band between the OFDM subcarriers, pilot subcarriers for channel estimation at a signal receiver, and training sequence subcarriers for time synchronization at the signal receiver, (2) a laser that produces laser light, and (3) an optical modulator that receives and modulates the laser light produce modulated laser light, the optical modulator being coupled to receive and apply the OFDM subcarriers, the pilot subcarriers and the training sequence subcarriers in modulating the laser light to carry the OFDM subcarriers, the pilot subcarriers and the training sequence subcarriers in the optical domain. The optical power of the pilot subcarriers is controlled to vary with optical frequencies of the pilot subcarriers so that optical power of a pilot subcarrier at a high optical frequency is different from optical power of another pilot subcarrier at a low optical frequency. This system includes an optical receiver that receives the modulated laser light produced by the optical transmitter. The optical receiver includes a photodiode that converts the received modulated laser light into an electrical signal and is operable to process the training sequence subcarriers in the electrical signal to measure frequency responses at the subcarrier frequencies and process the pilot subcarriers in the electrical signal to measure a phase shift between the training sequence and a respective OFDM data frame.

FIG. 1 shows an example of a system for intensity modulation DDO-OFDM (IM-DDO-OFDM) transmission system. This is a testing system that was built to demonstrate the operation of the described method. Electrical OFDM signal is generated by using an arbitrary waveform generator (AWG). The time domain waveform is generated with a MATLAB program including mapping pseudorandom binary sequence (PRBS) data into corresponding QPSK subcarriers within multiple OFDM symbols, which are subsequently converted into time domain using 256 points IFFT, and inserted with cyclic prefix. In our experiment there are 256 subcarriers, among them 192 are for data, 8 for pilots and 56 subcarriers are set to zero for oversampling. Because the symbols mapped into the data and pilots subcarriers are conjugate symmetrical, there are only half useful information, and the output OFDM signal is real. The cyclic prefix is ⅛ of an OFDM period which would be 32 samples in every OFDM frame. A frame of the known information acting as training sequence is inserted at the front of data frames in every OFDM block for time synchronization and channel rough estimation. For example, the amplitude (Vp-p) of the electrical OFDM signal for our testing system is 2 V.

The generated baseband OFDM signal is employed to drive a Mach-Zehnder (MZM) external modulator to modulate a CW lightwave (e.g., with the power of 14.5 dBm) generated from a laser, e.g., an external cavity laser (ECL). The optical OFDM signal at the power of 2.9 dBm is then input into two spans of 50 km standard single mode fiber (SMF) with dispersion of 17 ps/nm/km and insertion loss of 0.2 dB/km. After the first span of 50 km SMF, the power of optical OFDM signal is −7.1 dBm and then amplified by an EDFA to be 2 dBm. The output power of EDFA after the second span of 50 km SMF is 8 dBm. At the receiver side, optical OFDM signal is detected and converted to electrical OFDM signal by a photodiode, e.g., a high speed PIN. The converted electrical OFDM signal is sampled by a commercial real-time oscilloscope and processed off-line with MATLAB programs as an OFDM receiver. The training sequence and pilot information are extracted to complete the channel estimation and equalization.

Figure 2:
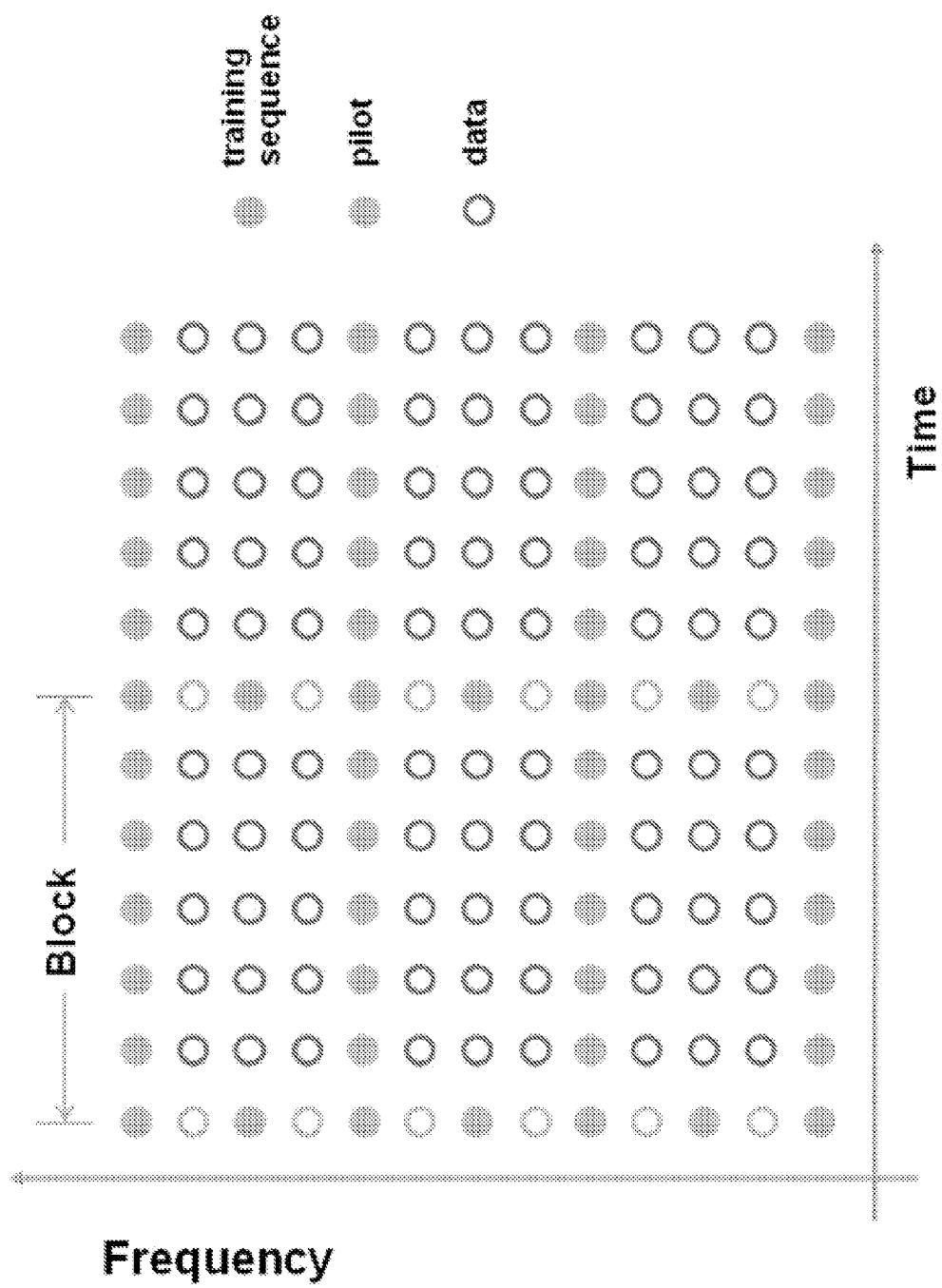
FIG. 2. The configuration of training sequence and pilots.

In this example, training sequence and pilots are used to work together to extract the channel information. Then the least square (LS) algorithm is adopted to calculate the channel transfer function. In addition, a cubic smoothing spline interpolation is applied to recover the data subcarriers. The training sequence is a known string of symbols at the beginning of each OFDM block to obtain frequency response at each subcarrier frequency. Pilots are inserted with known values to estimate the phase shift between the training sequence and the current data frames. An example of the training sequence and the pilot configuration is shown in FIG. 2. A frame of training sequence and 160 frames of data are considered in an OFDM block.

Figure 3A:
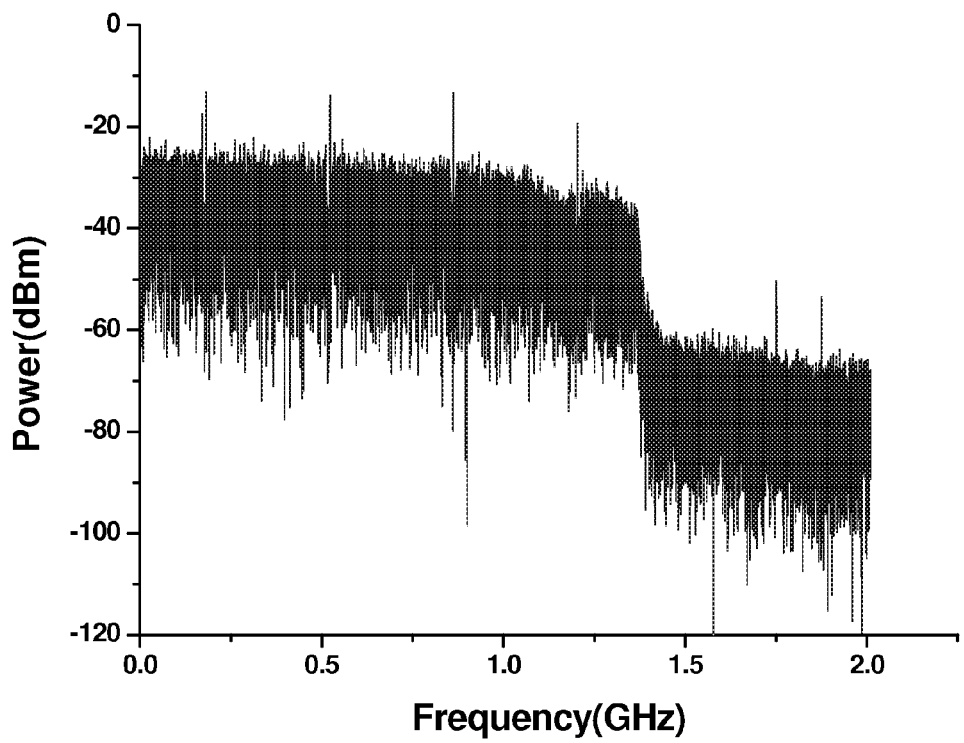
FIGS. 3A and 3B. The electrical spectrum of the OFDM signal before transmission (A) and after 100 km SMF fiber transmission (B).
Figure 3B:
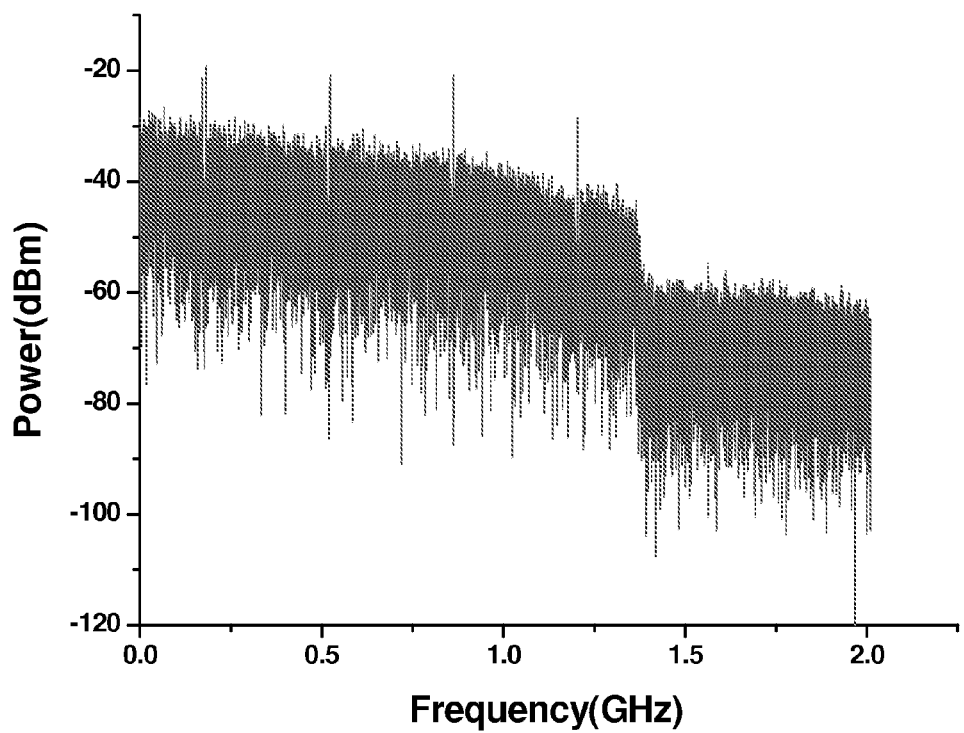
Figure 4:
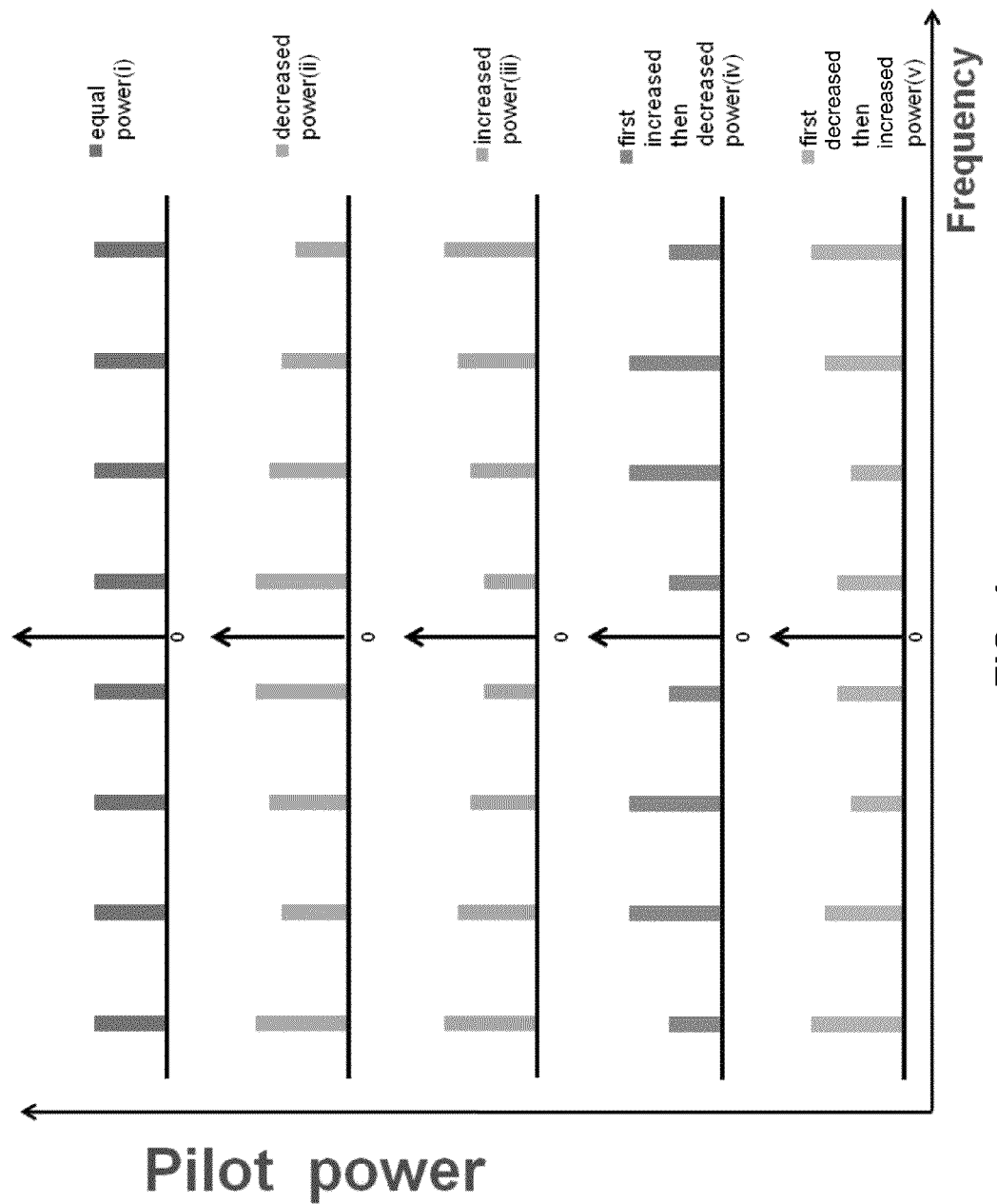
FIG. 4. Different pilot power allocation schemes.
Figure 6:
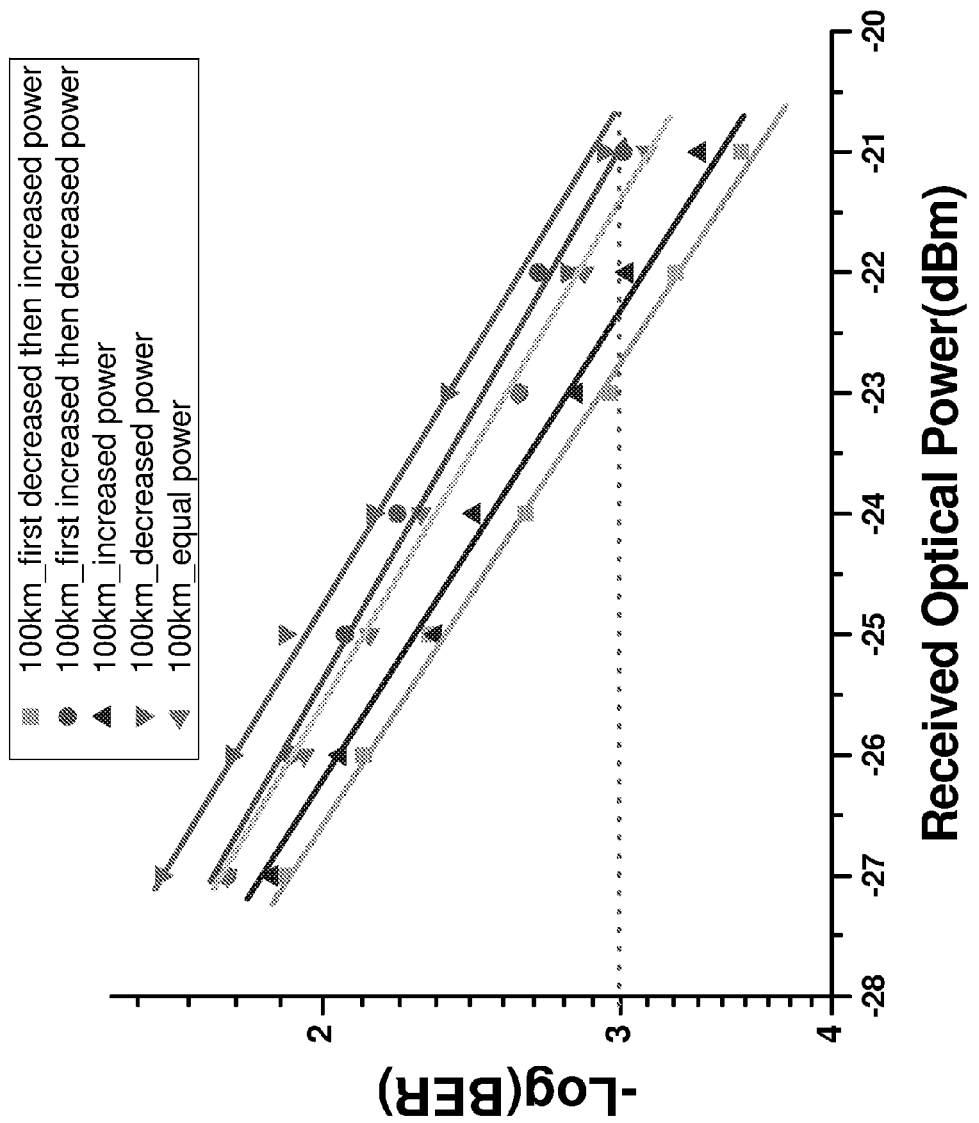
FIG. 6. Curves of BER vs. received optical power.

By comparing the electrical spectrum of the transmitted and received OFDM signal showed in FIGS. 3A and 3B, it is evident that different frequency components experience different degradations. Overall, the OFDM subcarriers at higher frequencies would get more attenuation. So the traditional channel estimation based on equal-power-pilots may not work well. We allocate pilots with different power to investigate the effect of pilot power allocation on the performance of channel estimation. FIG. 4 shows the five schemes of pilot power allocation. As the frequency increasing, they are (i) equal power, (ii) decreased power, (iii) increased power, (iv) first increased then decreased power, (v) first decreased then increased power. As the FIG. 4 shows, the subcarriers are conjugated symmetrical.

FIGS. 5A-5E and FIG. 6 show constellations and measured BER as a function of the optical power of the received OFDM signals, respectively. A comparison of the measurements in FIGS. FIGS. 5A-5E indicate that the distribution of the constellation in FIG. 5E is the most compact and clearest. Measurements in FIG. 6 suggest that the receiver sensitivity at a BER of $1 \times 10^{-3}$ for the OFDM signal with scheme (i-v) after transmission over 100 km SMF is −21.3, −20.6, −22.3, −20.9 and −22.7 dBm, respectively. So the scheme (v) can better improve the system performance than the case of the equal power.

This feature may be explained by the following factors. First, with respect to the fading depth of each subcarrier, amplitudes of different subcarriers of OFDM signal are proportional to subcarrier index so that the OFDM subcarriers at the high frequency end will get more attenuation that the subcarriers at the low frequency end. As such, the frequency fading (FF) induced by chromatic dispersion may cause more power attenuation to subcarriers at higher frequencies than the lower frequencies. Second, the electrical OFDM signal can be recovered from beating between optical carrier and subcarriers of OFDM signal in a square-law photon detector. The beating between OFDM subcarriers in a square-law photodetector will generate SSMI, which will degrade the received OFDM signal. The lower the frequency of the subcarriers is, the stronger SSMI becomes. Therefore, the subcarrier closer to the optical carrier is subject to stronger interference that a subcarrier farther away from the optical carrier. Therefore in scheme (v), setting more power on both lower and higher frequencies improves the performance.

Additionally, the scheme (iii) works better than scheme (i) and (ii). One reasonable explanation is that the power attenuation caused by FF has a greater effect on the system performance than SSMI does. Increased power allocation on pilots at higher frequencies than lower frequencies can reduce impairments in the system. This aspect is demonstrated by the improved performance in the scheme (iv) over the performance in the scheme (ii).

Therefore, the effect of pilot power on the performance of channel estimation in the DDO-OFDM baseband system were investigated using the system in FIG. 1. The pilots used in our tests were set with several different power allocation schemes and the experimental results show that the receiver sensitivity at a BER of $10^{-3}$ for OFDM signal with scheme (i-v) after transmission over 100 km SMF is −21.3, −20.6, −22.3, −20.9 and −22.7 dBm, respectively. So the scheme that first decreases at lower frequencies and then increases the pilot power at higher frequencies can be used to significantly improve the channel estimation performance compared with other schemes.

Certain features or aspects in the disclosed and other embodiments, modules and the functional operations can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for optical communications based on optical orthogonal frequency division multiplexing (OFDM), comprising:

operating a signal transmitter to modulate laser light to produce modulated light that carries, in optical domain, OFDM subcarriers for carrying communication information, without a frequency guard band between the OFDM subcarriers, and pilot subcarriers for channel estimation at a signal receiver, each pilot subcarrier being free of communication information; and controlling optical power of the pilot subcarriers to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband, wherein the scheme includes, with increasing subcarrier frequencies, first decreasing optical signal power of pilot subcarriers and then increasing power of pilot subcarriers for pilot sub carriers.

2. The method as in claim 1, comprising:
assigning the pilot subcarriers with respective values to provide a measurement of a phase shift at the signal receiver.

3. The method as in claim 1, comprising:
in operating the signal transmitter to modulate the laser light, generating training sequence subcarriers for time synchronization at the signal receiver, along with the OFDM subcarriers for carrying communication information and pilot subcarriers for channel estimation, wherein the training sequence subcarriers are inserted in front of an OFDM block.

4. The method as in claim 3, comprising:
at the signal receiver, processing the training sequence subcarriers to measure frequency responses at the subcarrier frequencies.

5. The method as in claim 3, comprising:
at the signal receiver, processing the pilot subcarriers to measure a phase shift between the training sequence and a respective OFDM data frame.

6. The method as in claim 1, wherein:
the modulation of the laser light is based on a double sideband modulation.

7. A method for optical communications based on optical orthogonal frequency division multiplexing (OFDM), comprising:
operating a signal transmitter to modulate laser light to produce modulated light that carries, in optical domain, OFDM subcarriers for carrying communication information, without a frequency guard band between the OFDM subcarriers, and pilot subcarriers for channel estimation at a signal receiver, each pilot subcarrier being free of communication information; and
controlling optical power of the pilot subcarriers to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband,
wherein the scheme includes, with increasing subcarrier frequencies, first increasing optical signal power of pilot subcarriers and then decreasing power of pilot subcarriers for pilot sub carriers.

8. A signal transmitter for optical communications based on optical orthogonal frequency division multiplexing (OFDM), comprising:
a signal transmitter module that produces OFDM subcarriers for carrying communication information, without a frequency guard band between the OFDM subcarriers, and pilot subcarriers for channel estimation at a signal receiver, each pilot subcarrier being free of communication information;
a laser that produces laser light; and
an optical modulator that receives and modulates the laser light produce modulated laser light, the optical modulator being coupled to receive and apply the OFDM subcarriers and the pilot subcarriers in modulating the laser light to carry the OFDM subcarriers and the pilot subcarriers in the optical domain;
wherein optical power of the pilot subcarriers is controlled to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband, wherein the scheme includes, with increasing subcarrier frequencies, first decreasing optical signal power of pilot subcarriers and then increasing power of pilot subcarriers for pilot subcarriers.

9. The signal transmitter as in claim 8, wherein
the signal transmitter module further generates training sequence subcarriers for time synchronization at the signal receiver, along with the OFDM subcarriers for carrying communication information and pilot subcarriers for channel estimation.

10. A signal transmitter for optical communications based on optical orthogonal frequency division multiplexing (OFDM), comprising:
a signal transmitter module that produces OFDM subcarriers for carrying communication information, without a frequency guard band between the OFDM subcarriers, and pilot subcarriers for channel estimation at a signal receiver, each pilot subcarrier being free of communication information;
a laser that produces laser light; and
an optical modulator that receives and modulates the laser light produce modulated laser light, the optical modulator being coupled to receive and apply the OFDM subcarriers and the pilot subcarriers in modulating the laser light to carry the OFDM subcarriers and the pilot subcarriers in the optical domain;
wherein optical power of the pilot subcarriers is controlled to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband, wherein the scheme includes, with increasing subcarrier frequencies, first increasing optical signal power of pilot subcarriers and then decreasing power of pilot subcarriers for pilot subcarriers.

11. An optical communication system for optical communications based on optical orthogonal frequency division multiplexing (OFDM), comprising:
an optical transmitter that includes (1) a signal transmitter module that produces OFDM subcarriers for carrying communication information, without a frequency guard band between the OFDM subcarriers, pilot subcarriers for channel estimation at a signal receiver, and training sequence subcarriers for time synchronization at the signal receiver, (2) a laser that produces laser light, and (3) an optical modulator that receives and modulates the laser light produce modulated laser light, the optical modulator being coupled to receive and apply the OFDM subcarriers, the pilot subcarriers and the training sequence subcarriers in modulating the laser light to carry the OFDM subcarriers, the pilot subcarriers and the training sequence subcarriers in the optical domain, wherein optical power of the pilot subcarriers is controlled to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband, wherein the scheme includes, with increasing subcarrier frequencies, first decreasing optical signal power of pilot subcarriers and then increasing power of pilot subcarriers for pilot subcarriers; and an optical receiver that receives the modulated laser light produced by the optical transmitter, the optical receiver including a photodiode that converts the received modulated laser light into an electrical signal and operable to process the training sequence subcarriers in the electrical signal to measure frequency responses at the subcarrier frequencies and process the pilot subcarriers in the electrical signal to measure a phase shift between the training sequence and a respective OFDM data frame.

12. The system as in claim 11, wherein
the training sequence subcarriers are inserted in front of an OFDM block.

13. An optical communication system for optical communications based on optical orthogonal frequency division multiplexing (OFDM), comprising:
an optical transmitter that includes (1) a signal transmitter module that produces OFDM subcarriers for carrying communication information, without a frequency guard band between the OFDM subcarriers, pilot subcarriers for channel estimation at a signal receiver, and training sequence subcarriers for time synchronization at the signal receiver, (2) a laser that produces laser light, and (3) an optical modulator that receives and modulates the laser light produce modulated laser light, the optical modulator being coupled to receive and apply the OFDM subcarriers, the pilot subcarriers and the training sequence subcarriers in modulating the laser light to carry the OFDM subcarriers, the pilot subcarriers and the training sequence subcarriers in the optical domain, wherein optical power of the pilot subcarriers is controlled to vary using a scheme that assigns optical power to pilot subcarriers based on optical frequencies of the pilot subcarriers so that optical power of a pilot subcarrier at a higher optical frequency in baseband is different from optical power of another pilot subcarrier at a lower optical frequency in the baseband, wherein the scheme includes, with increasing subcarrier frequencies, first increasing optical signal power of pilot subcarriers and then decreasing power of pilot subcarriers for pilot subcarriers; and an optical receiver that receives the modulated laser light produced by the optical transmitter, the optical receiver including a photodiode that converts the received modulated laser light into an electrical signal and operable to process the training sequence subcarriers in the electrical signal to measure frequency responses at the subcarrier frequencies and process the pilot subcarriers in the electrical signal to measure a phase shift between the training sequence and a respective OFDM data frame.

14. The method as in claim 7, comprising:
assigning the pilot subcarriers with respective values to provide a measurement of a phase shift at the signal receiver.

15. The method as in claim 7, comprising:
in operating the signal transmitter to modulate the laser light, generating training sequence subcarriers for time synchronization at the signal receiver, along with the OFDM subcarriers for carrying communication information and pilot subcarriers for channel estimation, wherein the training sequence subcarriers are inserted in front of an OFDM block.

16. The method as in claim 15, comprising:
at the signal receiver, processing the training sequence subcarriers to measure frequency responses at the subcarrier frequencies.

17. The method as in claim 15, comprising:
at the signal receiver, processing the pilot subcarriers to measure a phase shift between the training sequence and a respective OFDM data frame.

18. The method as in claim 7, wherein:
the modulation of the laser light is based on a double sideband modulation.

19. The signal transmitter as in claim 10, wherein:
the signal transmitter module further generates training sequence subcarriers for time synchronization at the signal receiver, along with the OFDM subcarriers for carrying communication information and pilot subcarriers for channel estimation.

20. The system as in claim 13, wherein:
the training sequence subcarriers are inserted in front of an OFDM block.

* * * * *